(12) United States Patent
Chen et al.

(10) Patent No.: US 9,385,551 B2
(45) Date of Patent: Jul. 5, 2016

(54) AUTOMATIC MOBILE DEVICE DETECTOR

(71) Applicant: Superior Communications, Inc., Irwindale, CA (US)

(72) Inventors: George Chen, Chatsworth, CA (US); Samuel Sentosa, Chino, CA (US)

(73) Assignee: Superior Communications, Inc., Irwindale, CA (US)

( * ) Notice: Subject to any disclaimer, the term of this patent is extended or adjusted under 35 U.S.C. 154(b) by 0 days.

(21) Appl. No.: 14/701,412

(22) Filed: Apr. 30, 2015

(65) Prior Publication Data

US 2015/0236540 A1   Aug. 20, 2015

Related U.S. Application Data

(63) Continuation of application No. 13/290,953, filed on Nov. 7, 2011.

(51) Int. Cl.
*H02J 7/00* (2006.01)

(52) U.S. Cl.
CPC ............. *H02J 7/0044* (2013.01); *H02J 7/0052* (2013.01)

(58) Field of Classification Search
CPC ....................................................... H02J 7/001
USPC ................................................ 320/107–115
See application file for complete search history.

(56) References Cited

U.S. PATENT DOCUMENTS 6,005,483 A * 12/1999 West ..................... G01F 23/243
                                                                340/612
8,358,100 B2 *  1/2013 Helfrich ................. G06F 1/266
                                                                320/103

* cited by examiner

*Primary Examiner* — Richard Isla Rodas
*Assistant Examiner* — Michael Dibenedetto
(74) *Attorney, Agent, or Firm* — Snell & Wilmer LLP

(57) ABSTRACT

Devices, methods and systems disclosed herein relate to a universal charger which provides a power supply for the charging of OMTP devices and non-OMTP devices based on whether an OMTP mobile communication device or a non-OMTP mobile communication device is connected. A power charging apparatus is provided for charging a mobile communication device. The power charging apparatus includes a connector for connecting to a charging port of the mobile communication device, and a controller coupled to the connector, the controller configured to determine whether the mobile communication device connected to the connector is a non-OMTP mobile communication device or an OMTP mobile communication device, the controller further configured to charge a non-OMTP mobile communication device when a non-OMTP mobile communication device is connected to the connector, and further configured to charge an OMTP mobile communication device when an OMTP mobile communication device is connected to the connector.

14 Claims, 6 Drawing Sheets

AUTOMATIC MOBILE DEVICE DETECTOR

CROSS REFERENCE TO RELATED APPLICATIONS

This application is a continuation of prior U.S. application Ser. No. 13/290,953, filed Nov. 7, 2011, the entire contents of which are herein incorporated by reference.

BACKGROUND

1. Field

The present invention relates to an apparatus, method and/or system for detecting a mobile device via a handshake circuit in order to provide a desired power supply to the mobile device.

2. Description of Related Art

Electronic devices such as cellular phones, portable tablet computers and the like are gaining widespread popularity. For example, the Apple® iPhone® is estimated to reach 100 million users by the end of 2011. In addition, almost 15 million Apple® iPads® have been sold to date. The sheer volume of electronic devices sold by other major competitors such as Motorola®, Samsung®, HTC®, etc. only further confirms the high level of consumer demand for these type of products. Indeed, it is not uncommon for a consumer to have multiple mobile communication devices. However, many devices generally require many different chargers (e.g., one charger for each device) which in turn, may then require the user to maintain or purchase a power charger for each of the user's devices. To reduce the number of chargers needed to operate different mobile communication devices, the Open Mobile Terminal Platform (OMTP) forum has established a Universal Charging Solution (UCS) initiative to assist in the standardization of mobile device charging through a micro-USB connector. Unfortunately, many devices do not adhere to the UCS initiative.

As a result, a typical universal charger is only applicable to devices that adhere to the UCS initiative, thereby rendering the universal charger useless for devices that do not adhere to the UCS initiative. As such, many users who utilize a mixture of OMTP devices and non-OMTP devices are still required to purchase and maintain multiple power chargers, thereby increasing cost and inconvenience to these users.

What is needed is a universal charger that can charge OMTP devices and certain non-OMTP devices thereby reducing the need for users to purchase and maintain multiple power chargers.

SUMMARY

Devices, methods and systems are directed to a universal charger which provides a power supply for the charging of OMTP devices and non-OMTP devices based on whether an OMTP mobile communication device or a non-OMTP mobile communication device is connected.

In one embodiment, a power charging apparatus is provided for charging a mobile communication device. The power charging apparatus includes a connector for connecting to a charging port of the mobile communication device, and a controller coupled to the connector, the controller configured to determine whether the mobile communication device connected to the connector is a non-OMTP mobile communication device or an OMTP mobile communication device, the controller further configured to charge a non-OMTP mobile communication device when a non-OMTP mobile communication device is connected to the connector, and further configured to charge an OMTP mobile communication device when an OMTP mobile communication device is connected to the connector.

In one embodiment, a controller for usage in a power device configured to charge a mobile communication device is provided. The controller may include a first pin having a first voltage caused by the connection of an OMTP mobile communication device to a connector, and having a second voltage caused by the connection of a non-OMTP mobile communication device to a connector. The controller may also include a comparator coupled to the first pin and configured to receive the voltage at the first pin and output a first signal when the first pin has the first voltage and a second signal when the first pin has a second voltage. The controller may also include a transistor configured to be tied to ground in response to the first pin having the first voltage and further configured to be left open in response to the first pin having the second voltage and a logic-timer unit coupled to the comparator, and configured to receive the first signal from the comparator when the first pin has the first voltage, and the second signal from the comparator when the first pin has a second voltage, the logic-timer unit further configured to cause the transistor to be tied to ground when the first pin has the first voltage, and to cause the transistor to be left open when the first pin has the second voltage.

In one embodiment, a method for charging an OMTP mobile communication device when the OMTP mobile communication device is connected to a connector of a power charger, and for charging a non-OMTP mobile communication device when the non-OMTP mobile communication device is connected to the connector is provided. The method may comprise comparing a voltage at a pin to a predetermined threshold, determining that the OMTP mobile communication device is connected to the connector when the voltage at the pin is below the predetermined threshold, determining that the non-OMTP mobile communication device is connected to the connector when the voltage at the pin is not below the predetermined threshold, supplying appropriate power to charge the OMTP mobile communication device when the OMTP mobile communication device is determined to be connected to the connector, and supplying appropriate power to charge the non-OMTP mobile communication device when the non-OMTP mobile communication device is determined to be connected to the connector.

BRIEF DESCRIPTION OF THE DRAWINGS

The features and advantages of the present invention will become more apparent from the detailed description set forth below when taken in conjunction with the drawings, wherein.

DETAILED DESCRIPTION

Apparatus, systems and/or methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
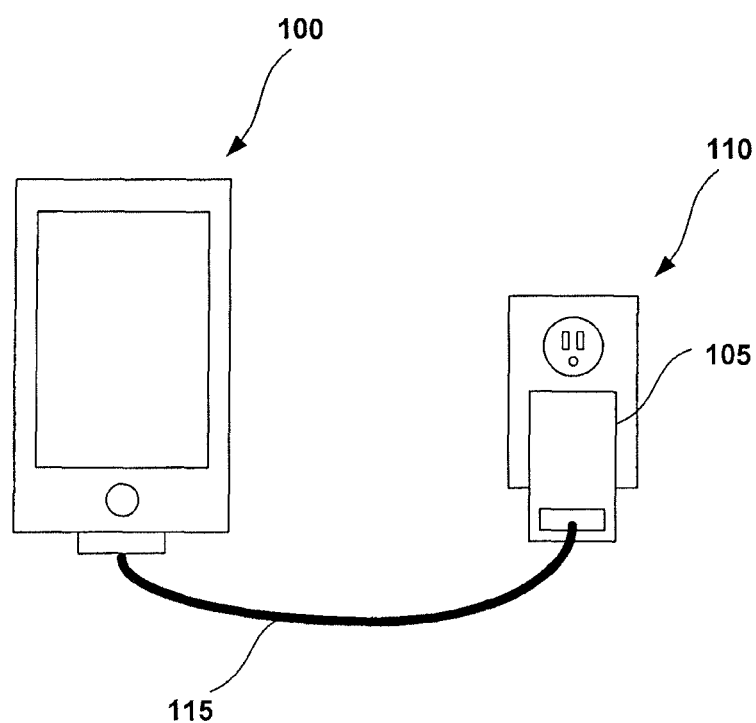
FIG. 1 illustrates a mobile device attached to a power supply via a power adapter having a handshake circuit according to one or more embodiments of the present invention.

FIG. 1 illustrates a mobile communication device 100 connected to a wall adapter 105 via a wire 115. The wall adapter 105 is plugged into a power supply 110 on a wall, which supplies power to the mobile communication device 100 to power the mobile communication device 100 and/or to charge a battery within the mobile communication device 100. The mobile communication device 100 may be an OTMP mobile communication device or it may be a non-OTMP mobile communication device. As the wall adapter 105 functions to operate and/or charge both the OTMP and/or non-OTMP mobile communication devices, it may be considered to be a true universal charger. One skilled in the art will understand that the wall charger 105 is merely one implementation of the concepts described herein, and that the following concepts may be utilized in, for example, a cigarette adapter and/or a multi-input adapter as well. Furthermore, these concepts may be applied to an extended portable battery and solar power charging device, among other implementations.

Figure 2:
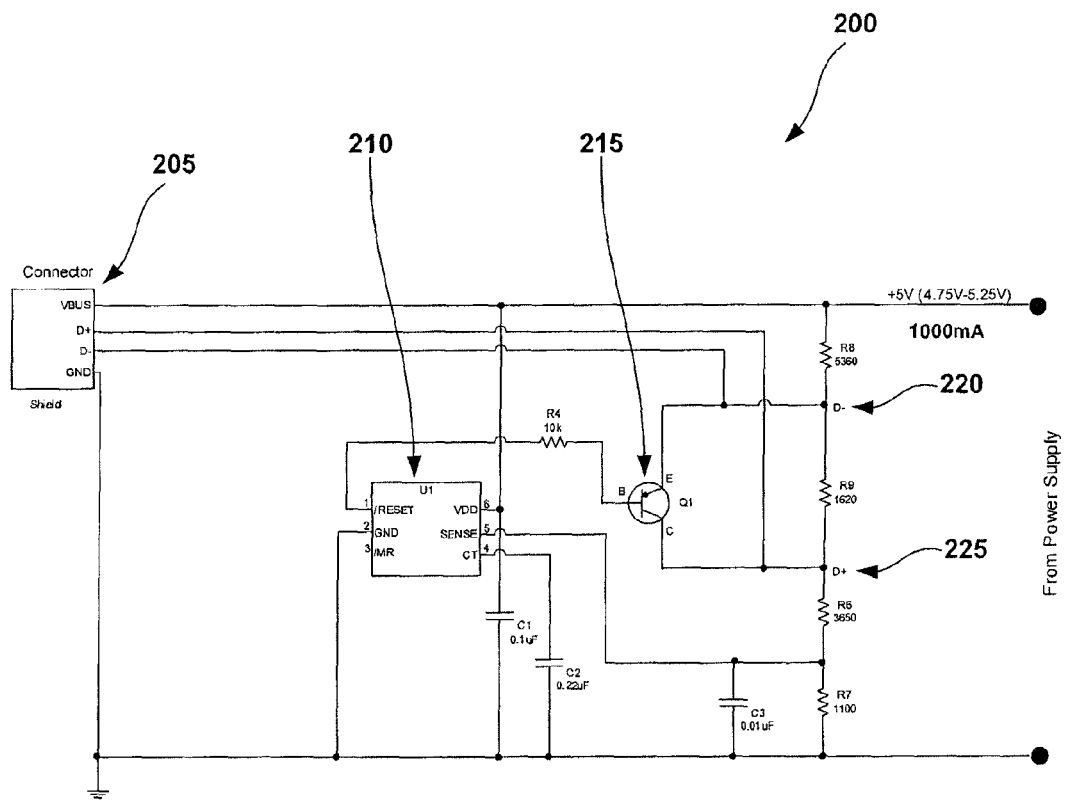
FIG. 2 illustrates a circuit diagram of a power charging circuit according to one or more embodiments of the present invention.

FIG. 2 illustrates a schematic of a circuit 200, which may be a part of the overall circuit housed in the wall charger 105. As shown, the circuit 200 may provide a current up to 1,000 mA, and may include a connector 205 (e.g., a USB or mini-USB connector) for connecting an OTMP or non-OTMP mobile communication device (e.g., mobile communication device 100) to be charged. The circuit 200 may also include a controller 210, a transistor 215 and a number of resistors and capacitors as illustrated. Alternatively, in one embodiment, a MOSFET may be used in place of the transistor 215.

The charge current to the mobile communication device (e.g., mobile communication device 100) is provided by the $V_{cc}$, which may be 5V, but the amount of current, if any, is determined by the hand shaking between the power supply and the mobile communication device through a D+ pin 225 and a D− pin 220. Based on the type of mobile communication device, the D+ pin 225 and the D− pin 220 are configured to be shorted with less than 200 ohms, or 2.7V applied to the D+ pin 225 and 2.0V applied to the D− pin 220, or 2.0V applied to the D+ pin 225 and 2.7V applied to the D− pin 220.

The circuit 200 in FIG. 2 addresses the auto detection by monitoring the D+ pin 225. Each OTMP and non-OTMP mobile communication device drains a different amount of current through the D+ pin 225 pulling down the voltage at the D+ pin 225.

For example, when an OTMP mobile communication device is connected to the connector 205, it may cause a voltage drop which in the circuit 200 is detected by the SENSE line of the controller 210. More particularly, the SENSE line detects whether the divided voltage drops below 0.4V, and if it does, the /RESET line is pulled LOW tying the base of the PNP transistor 215 to ground. In effect, this turns ON PNP transistor 215 and shorts the D+ and D− pins 220 and 225, which provides the correct handshaking for OMTP mobile communication devices. Thus, a connected OMTP mobile communication device is chargeable through the circuit 200.

Figure 3A:
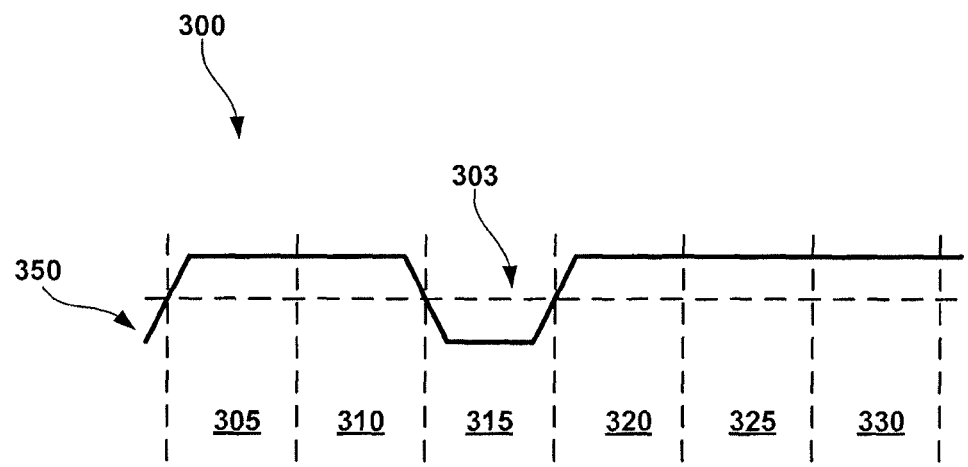
FIG. 3A illustrates a timing diagram of the SENSE line of the power charging circuit of FIG. 2 according to one or more embodiments of the present invention.
Figure 3B:
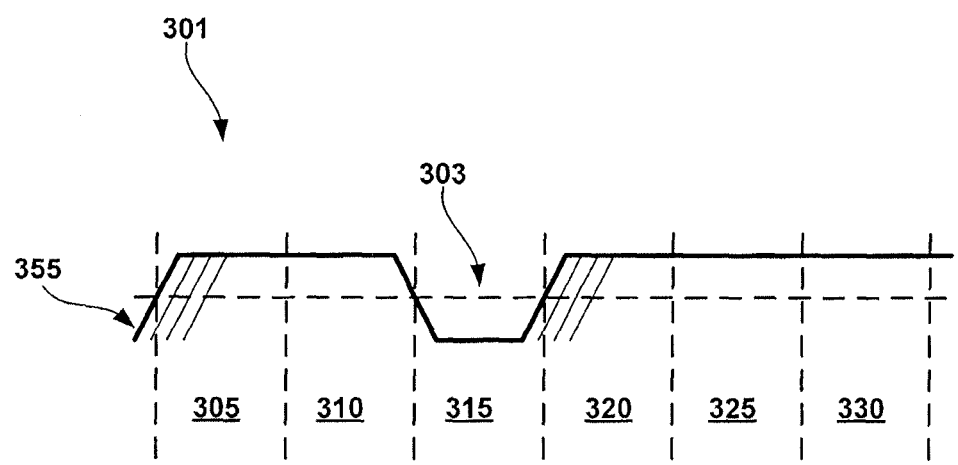
FIG. 3B illustrates a timing diagram of the RESET line of the power charging circuit of FIG. 2 according to one or more embodiments of the present invention.

Conversely, when a non-OMTP mobile communication device is connected to the connector 205, the divided voltage on the SENSE line is above 0.4V. As a result, the /RESET line is left open, leaving the base of the PNP transistor 215 floating. This turns OFF PNP transistor 215, leaving the D+ pin 225 at 2.7V and the D− pin 220 at 2.0V, or the D+ pin 225 at 2.0V and the D− pin 220 at 2.7V, which is the correct handshaking for non-OMTP mobile communication devices, thereby allowing a connected non-OMTP mobile communication device to be chargeable through the circuit 200 as well. FIGS. 3A and 3B describe the timing of these events.

In this embodiment, the resistors, R6, R7, R8 and R9 (3,650 ohms, 1,100 ohms, 5,360 ohms and 1,620 ohms, respectively) are selected to provide the correct voltages to the D+ and D− pins 225 and 220, to provide a range that matches the current flow in and out of the D+ and D− pins 225 and 220 for a wide spectrum of mobile communication devices, and to provide the correct divider ratio for the SENSE line.

FIGS. 3A and 3B illustrate timing diagrams of the SENSE line and RESET line, respectively. Turning to FIG. 3A, a timing diagram 300 is provided for the SENSE line 350 (e.g., corresponding to the SENSE line illustrated in FIG. 2). At startup 305, the SENSE line 350 is pulled high above the threshold 303. At timing 310, the USB connection is detected and the SENSE line 350 remains high. As discussed above, when the OMTP-type mobile communication device is connected to the USB connector, the SENSE line 350 is pulled low. Accordingly, timing 315 corresponds to the timing where an OMTP-type mobile communication device is connected to the USB connector. At timing 320, the OMTP-type mobile communication device is disconnected, thereby causing the SENSE line 350 to return to its default high state. At timing 325, the USB connector is detected again causing the SENSE line 350 to remain high. At timing 330, which corresponds to when a non-OMTP mobile communication device is connected to the USB connector, the SENSE line 350 remains high, thereby functioning to charge the non-OMTP mobile communication device. In this manner, the circuit (e.g., circuit 200) having the SENSE line 350, may operate to selectively charge a connected OMTP mobile communication device and/or a connected non-OMTP mobile communication device. Stated differently, the user may swap between charging OMTP mobile communication devices and non-OMTP mobile communication device by utilizing the circuit 200.

Similarly, FIG. 3B illustrates a timing diagram 301 for the RESET line 355 (e.g., corresponding to the RESET line illustrated in FIG. 2). At startup 305, the RESET line 355 is pulled high above the threshold 303 after a short delay (e.g., on the order of 10 microseconds). At timing 310, the USB connection is detected and the RESET line 355 remains high. When the OMTP-type mobile communication device is connected to the USB connector, the RESET line 355 is pulled low at timing 315. At timing 320, the OMTP-type mobile communication device is disconnected, thereby causing the RESET line 355 to return to its default high state after a short delay. At timing 325, the USB connector is detected again causing RESET line 355 to remain high. At timing 330, which corresponds to when a non-OMTP mobile communication device is connected to the USB connector, the RESET line 355 remains high, thereby functioning to charge the non-OMTP mobile communication device.

Figure 4:
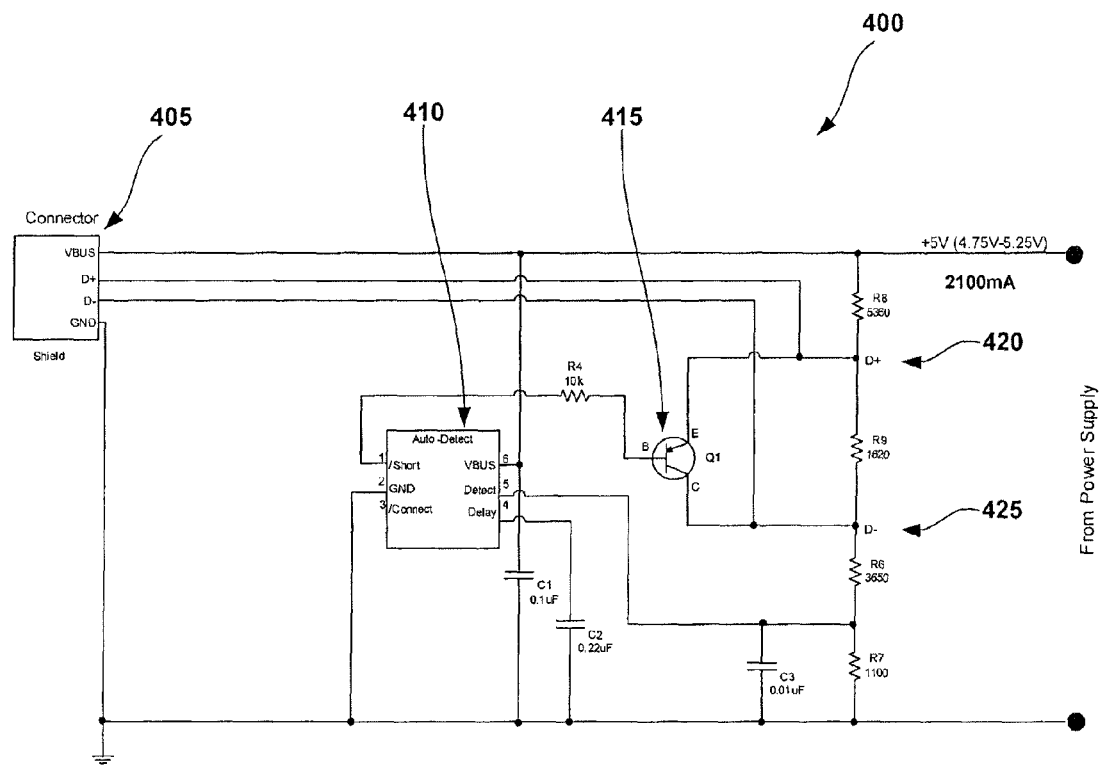
FIG. 4 illustrates a circuit diagram of a power charging circuit according to one or more embodiments of the present invention.

FIG. 4 illustrates another embodiment of the present invention. More particularly, FIG. 4 depicts a schematic of a circuit 400, which may also be a part of the overall circuit housed in the wall charger 105. As shown, the circuit 400 may include a connector 405 (e.g., a USB or mini-USB connector) for connecting an OTMP or non-OTMP mobile communication device (e.g., mobile communication device 100) to be charged. The circuit 400 may also include a controller 410, a transistor 415 (or a MOSFET) and a number of resistors and capacitors as illustrated. One difference between the circuit 400 of FIG. 4 and the circuit 200 of FIG. 2 is that the former is configured to provide current up to 1,000 mA, while the latter is configured to provide current up to 2,100 mA. However, the structure and functionality between circuit 200 and circuit 400 are generally similar.

Figure 5:
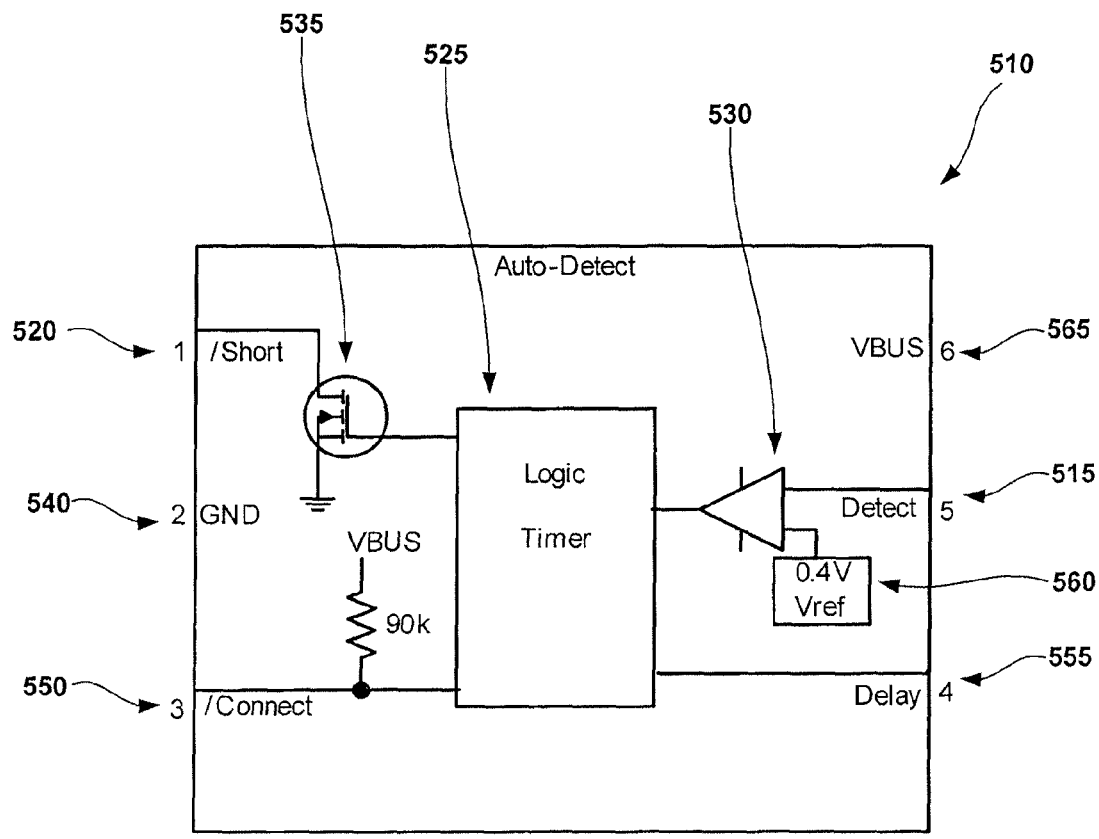
FIG. 5 illustrates a circuit diagram of a power charging circuit according to one or more embodiments of the present invention.

FIG. 5 illustrates a detailed view of a controller 510 (e.g., operating as an auto-detect device or discrete circuit). The controller 510 may, in one embodiment, be the controllers 210 and 410. For the sake of clarity, the controller 510 will be described below as the controller 410 of FIG. 4. However, one skilled in the art will understand that this is merely one implementation and that the controller 410 of FIG. 4 may be different than the controller 510 of FIG. 5.

The controller 510 provides precise voltage threshold monitoring, and delay and logic switches to provide the correct voltage levels on the D+ and D− pins based on the mobile communication device requirements. As shown, the controller 510 may include six pins including a DETECT or SENSE pin 515 and a /SHORT or /RESET pin 520. In addition, there may be a GROUND (GND) pin 540, a /CONNECT or /MASTER RESET pin 550, a DELAY or CT pin 555, and a VBUS or VDD pin 565. The controller 510 may also include a logic-timer block 525 and a reference voltage 560.

More particularly, the controller 510 operates as follows. At startup, with no mobile device connected, the D+ pin 420 voltage is set at 2.7V and D− pin 425 voltage is set at 2.0V as shown in FIG. 4. When the D− pin 425 voltage drops due to current flow into the mobile communication device, the DETECT pin 515 of FIG. 5 is pulled below 0.4V, changing the output of a comparator 530.

The logic block 525 pulls the gate of a field-effect transistor (FET) 535 low, tying or pulling the /SHORT pin 520 to ground. With the /SHORT pin 520 pulled LOW, the gate of the PNP transistor 415 is pulled LOW, turning on the PNP transistor 415 and shorting the D+ and D− pins 420 and 425. As configured, a 100 ms-10 second delay is built into the logic-timer block 525 during initial power ramp of VBUS pin 565, and any state changes to the /CONNECT pin 550 or the /SHORT pin 520 allows the voltages at D+ and D− pins 420 and 425 to stabilize, thereby allowing the mobile communication device to handshake with these stabilized voltages. The /CONNECT pin 550 can also be connected to the floating ground shield of the USB cable to detect when a mobile communication device has been connected to the circuit of the controller 510. If the /CONNECT pin 550 is pulled LOW, the logic-timer block 525 pulls the gate of the FET 535 and the /SHORT pin 520 LOW. If the /CONNECT pin 550 is HIGH or left floating, the logic-timer block 525 allows normal operation to occur.

Specifically, the comparator 530 is configured to compare the voltage at the DETECT pin 515 with a reference voltage (e.g., 0.4V), and outputs a first signal when the result of the comparison is that the voltage at the DETECT pin 515 is below the reference voltage, and outputs a second signal when the result of the comparison is that the voltage at the DETECT pin 515 is not below the reference voltage.

Figure 6:
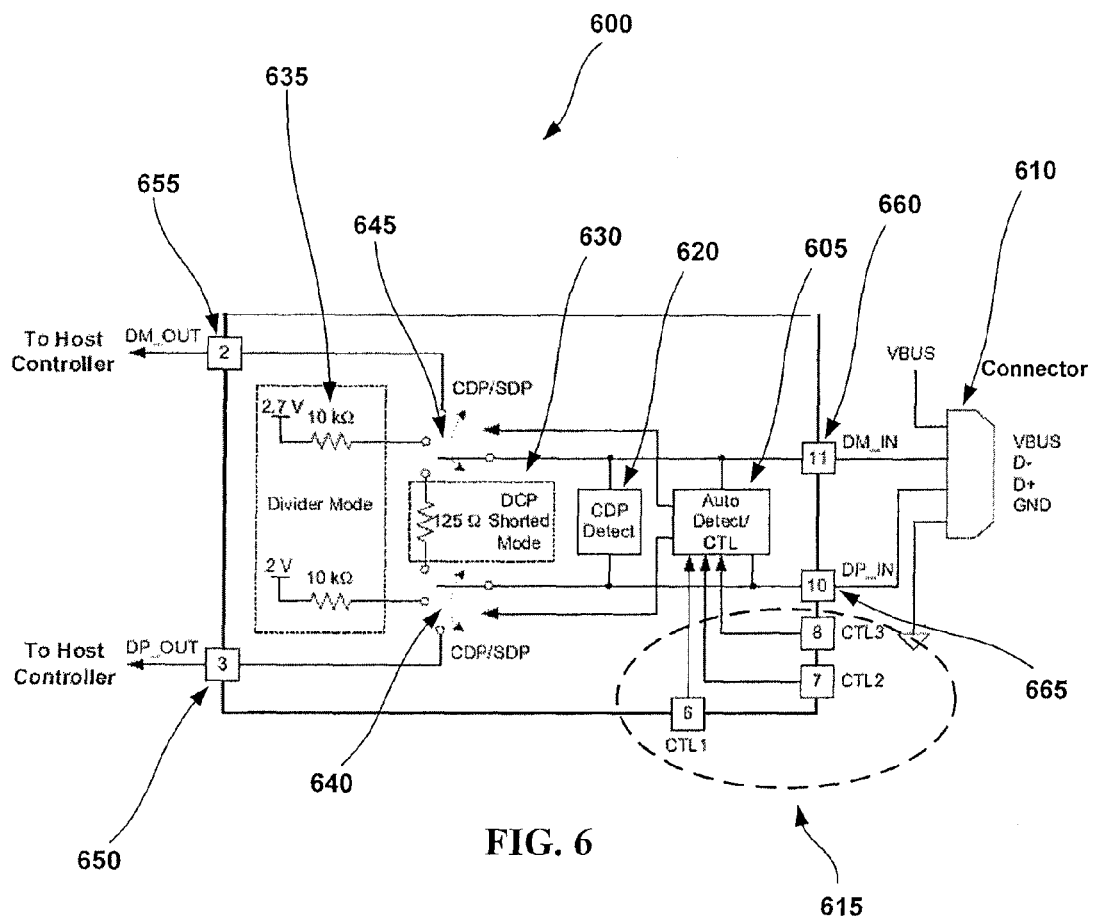
FIG. 6 illustrates a circuit diagram of a power charging circuit according to one or more embodiments of the present invention.

Another implementation of a circuit capable of charging both OTMP and non-OTMP devices, is illustrated in FIG. 6. The circuit 600, as well as the other circuits described herein, provide an auto detection and hand shaking capabilities so that one power supply can meet the hand shaking and charging needs of most, if not all, mobile communication devices (e.g., OTMP and non-OTMP devices). The circuit 600 may be a fully integrated single chip solution.

As shown, the circuit 600 may include a connector 610 for interfacing with a mobile communication device, an Auto Detect Controller 605, a dedicated charging port (DCP) shorted mode 630 and a divider mode 635. Optionally, the circuit 600 may also include a charging downstream port (CDP) detector 620, and a way to output the voltage at the D− and D+ pins (e.g., DM_OUT 655 and DP_OUT 650) at connections 2 and 3 to, for instance, a host controller. However, under one implementation of the circuit 600, the control input 615 (e.g., CTL 1, CTL 2 and CTL 3 at connections 6-8, respectively) may be set to select the Auto Detect Controller 605, and to not select the CDP detector 620 or to output to the host controller. Accordingly, the Auto Detect Controller 605 may receive input voltages DM_IN 660 and DP_IN 665 via connections 11 and 10 to determine whether switches 640 and 645 are switched to select the dedicated charging port (DCP) shorted mode 630 or the divider mode 635. For example, when the device connected to the connector 610 is an OMTP device, the DCP shorted mode 630 may be selected by the switches 640 and 645, shorting the connections 10 and 11 corresponding to the DM_IN 660 and DP_IN 665, thereby providing the correct handshaking for OMTP mobile communication devices, and allowing charging of OMTP devices through the circuit 600.

Conversely, when the device is connected to the connector 610 is a non-OMTP mobile communication device (e.g., where the user disconnects an OMTP mobile communication device from the connector 610 and connects a non-OMTP mobile communication device to the connector 610), the divider mode 635 may be selected by the switches 640 and 645, floating the connections 10 and 11 corresponding to the DM_IN 660 and DP_IN 665, thereby providing the correct handshaking for the non-OMTP mobile communication devices, and allowing the charging of non-OMTP mobile communication devices through the circuit 600.

In this manner, the circuit 600 may be utilized to charge both OMTP mobile communication devices and non-OMTP mobile communication devices based on which type of device is connected to the connector 610 of the circuit 600.

The circuit 600 of FIG. 6 is configured to provide a current of 1,000 mA. However, in another embodiment, the circuit 600 may be configured to provide a current of 2,100 mA. To facilitate the providing of the higher current, the divider mode 635 may be adjusted such that the DMIN 660 is connected to the 2.0V and the DP_IN 665 is connected to the 2.7V.

Skilled artisans may implement the described functionality in varying ways for each particular application, but such implementation decisions should not be interpreted as causing a departure from the scope of the disclosed apparatus and/or methods.

The previous description of examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The elements and uses of the above-described embodiments can be rearranged and combined in manners other than specifically described above, with any and all permutations within the scope of invention. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope. In addition, the invention is not limited to the illustrated embodiments, and all embodiments of the invention need not necessarily achieve all the advantages or purposes or possess all characteristics identified herein.

What is claimed is:

1. A power charging device configured to charge a mobile communication device, the power charging device comprising:
   a voltage divider coupled to a first pin that provides current for charging the mobile communication device, the mobile communication device being an Open Mobile Terminal Platform (OMTP) mobile communication device or a non-OMTP mobile communication device; and
   a controller including:
      a second pin coupled to the voltage divider and receives a first voltage when the OMTP mobile communication device is connected to a connector or a second voltage caused by the connection of a non-OMTP mobile communication device to a connector,
      a comparator coupled to the second pin and configured to:
         receive the first voltage or the second voltage from the second pin, and
         output a first signal when the first voltage is received and a second signal when the second voltage is received; and
      a logic-timer coupled to the comparator and configured to:
         receive the first signal or the second signal from the comparator,
         cause a short across at least a portion of the voltage divider to provide a first current for charging the OMTP mobile communication device from the first pin when the first signal is received at the second pin, and
         provide a second current for charging the non-OMTP mobile communication device from the first pin when the second signal is received at the second pin.

2. The power charging device of claim 1, wherein the comparator is configured to compare a voltage at the second pin with a reference voltage, and output the first signal when the voltage at the second pin is below the reference voltage, and output the second signal when the voltage at the second pin is not below the reference voltage.

3. The power charging device of claim 2, wherein the reference voltage is about 0.4V.

4. The power charging device of claim 1, wherein the controller further includes:
   a transistor configured to be tied to ground in response to the second pin having the first voltage and further configured to be left open in response to the second pin having the second voltage; and
   a third pin coupled to the transistor, the third pin configured to:
      provide a first voltage for charging the OMTP mobile communication device when the OMTP mobile communication device is connected to the connector, and configured provide a second voltage for charging the non-OMTP mobile communication device when the non-OMTP mobile communication device is connected to the connector.

5. The power charging device of claim 4, wherein the transistor is a PNP, a NPN or a MOSFET.

6. The power charging device of claim 1, wherein the connector is a USB connector.

7. The power charging device of claim 1, wherein the logic-timer has a built-in delay that stabilizes voltages to allow handshaking with the mobile communication device.

8. The power charging device of claim 1, wherein the first pin is a V pin, the voltage divider is further coupled to a D+ pin and D− pin, and the short is at the D+ pin and D+ pin.

9. A power charging device configured to charge a mobile communication device, the power charging device comprising:
   a voltage divider coupled to a first pin that provides current for charging the mobile communication device, the mobile communication device being an Open Mobile Terminal Platform (OMTP) mobile communication device or a non-OMTP mobile communication device; and
   a controller including:
      a second pin having a voltage caused by the connection of the OMTP mobile communication device or the non-OMTP mobile communication device to a connector;
      a comparator coupled to the second pin and configured to:
         compare a voltage at the second pin with a reference voltage;
         output a first signal when the voltage at the second pin is below the reference voltage, and
         output a second signal when the voltage at the second pin is greater than or equal to the reference voltage;
      a transistor configured to be turned on and cause a short across at least a portion of the voltage divider to provide a first current for charging an OMTP mobile communication device from the first pin in response to the first signal, and configured to be off and to provide a second current for charging the non-OMTP mobile communication device from the first pin in response to the second signal; and
      a third pin coupled to the transistor and configured to provide a first voltage for charging the OMTP mobile communication device when the transistor is turned on and the OMTP mobile communication device is connected to the connector, and configured to provide a second voltage for charging the non-OMTP mobile communication device when the transistor is off and the non-OMTP mobile communication device is connected to the connector.

10. The power charging device of claim 9, wherein the reference voltage is about 0.4 V.

11. The power charging device of claim 9, wherein the transistor is a PNP, a NPN or a MOSFET.

12. The power charging device of claim 9, wherein the connector is a USB connector.

13. The power charging device of claim 9, wherein the controller further includes a fourth pin configured to be connected to a ground shield of the connector for detecting whether the mobile communication device has been connected to the connector.

14. The power charging device of claim 9, wherein the controller further includes a logic-timer coupled to the comparator and configured to cause the transistor to be turned on when the logic-timer receives the first signal from the comparator.

* * * * *